US012645771B1

(12) United States Patent
Gupta et al.

(10) Patent No.: US 12,645,771 B1
(45) Date of Patent: Jun. 2, 2026

(54) DISABLING TWO-FACTOR AUTHENTICATION IN RESPONSE TO A TRIGGER EVENT

(71) Applicant: Motorola Mobility LLC, Chicago, IL (US)

(72) Inventors: Ranjeet Gupta, Plainfield, IL (US); Manju Mani, Bangalore (IN); Ajit Kumar Panda, Vernon Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 39 days.

(21) Appl. No.: 19/013,919

(22) Filed: Jan. 8, 2025

(51) Int. Cl.
*G06F 21/31* (2013.01)
*H04M 1/72454* (2021.01)

(52) U.S. Cl.
CPC ........ *G06F 21/31* (2013.01); *H04M 1/72454* (2021.01); *G06F 2221/2137* (2013.01)

(58) Field of Classification Search
CPC .............. G06F 21/31; H04M 1/72418; H04M 1/72421
See application file for complete search history.

(56) References Cited

U.S. PATENT DOCUMENTS

| | | | | |
|---|---|---|---|---|
| 2013/0312061 | A1* | 11/2013 | Casals Andreu | ....... G06F 21/40 |
| | | | | 726/3 |
| 2017/0214679 | A1* | 7/2017 | Lin | ........................ H04L 63/083 |
| 2019/0377864 | A1* | 12/2019 | Mossoba | ................. G06F 21/31 |
| 2024/0154955 | A1* | 5/2024 | Stalling | ................... G06F 21/31 |

* cited by examiner

*Primary Examiner* — Ponnoreay Pich
(74) *Attorney, Agent, or Firm* — FIG. 1 Patents

(57) ABSTRACT

In aspects of disabling two-factor authentication (2FA) in response to a trigger event, a mobile device detects a trigger event while 2FA is enabled on the mobile device. The trigger event may include or be an example of at least one of an error indication associated with a hardware component of the mobile device, user input indicating to disable the 2FA, or an emergency call initiated from the mobile device. In response to the trigger event, the mobile device disables the 2FA. The mobile device initiates a timer for operation in a single-factor authentication mode based on the 2FA being disabled. During operation in the single-factor authentication mode, the mobile device controls access to a functionality of the mobile device, such as by controlling access to at least one application of the mobile device. After expiry of the timer, the mobile device may re-enable the 2FA.

20 Claims, 5 Drawing Sheets

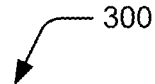
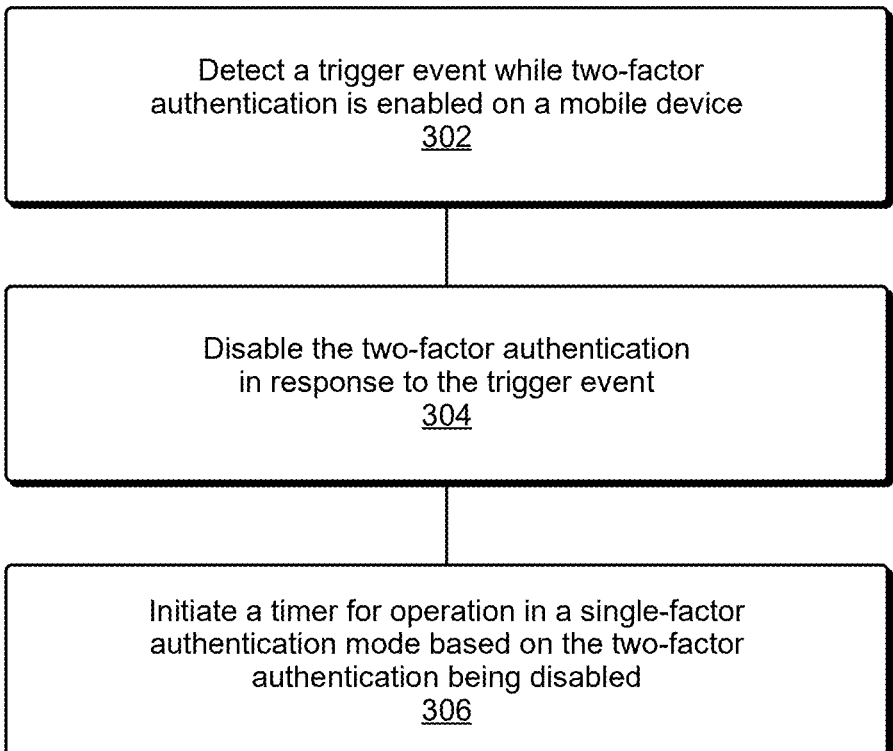
Detect a trigger event while two-factor
authentication is enabled on a mobile device
302
Disable the two-factor authentication
in response to the trigger event
304
Initiate a timer for operation in a single-factor
authentication mode based on the two-factor
authentication being disabled
306
*FIG. 3*

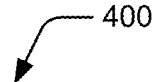
400

Disable two-factor authentication on a mobile device
in response to an error indication associated with a
hardware component of the mobile device, user input
indicating to disable the two-factor authentication, and/or
an emergency call initiated from the mobile device
402

Initiate a timer for operation in a single-factor
authentication mode based on the two-factor
authentication being disabled
404

Control access to a functionality of the mobile device
during operation in the single-factor authentication mode
406

FIG. 4

DISABLING TWO-FACTOR AUTHENTICATION IN RESPONSE TO A TRIGGER EVENT

BACKGROUND

Today's person is afforded a tremendous selection of devices that are capable of performing a multitude of tasks. As technology advances, device capabilities expand, and our reliance and use of them likewise increases. For example, mobile devices support various functionality, such as facilitating financial transactions, email access, web browsing, and the like, in a relatively small form factor to maintain portability. A user can employ their mobile device for a wide range of tasks, from attending a doctor's appointment to managing stock portfolios. As such, mobile devices can contain sensitive information, such as confidential material, private correspondence, personal identification details, login credentials, and so forth. In order to protect such information from being accessed by unauthorized individuals, some mobile devices may employ security techniques that require multiple forms of identity verification prior to allowing access. However, such techniques can be complex and time-consuming, which can be inconvenient and can lead to user frustration.

BRIEF DESCRIPTION OF THE DRAWINGS

Implementations of the techniques for disabling two-factor authentication (2FA) in response to a trigger event are described with reference to the following Figures. The same numbers may be used throughout to reference like features and components shown in the Figures.

FIGS. 2-4 illustrate example methods for disabling 2FA in response to a trigger event in accordance with one or more implementations of the techniques described herein.

DETAILED DESCRIPTION

Figure 1:
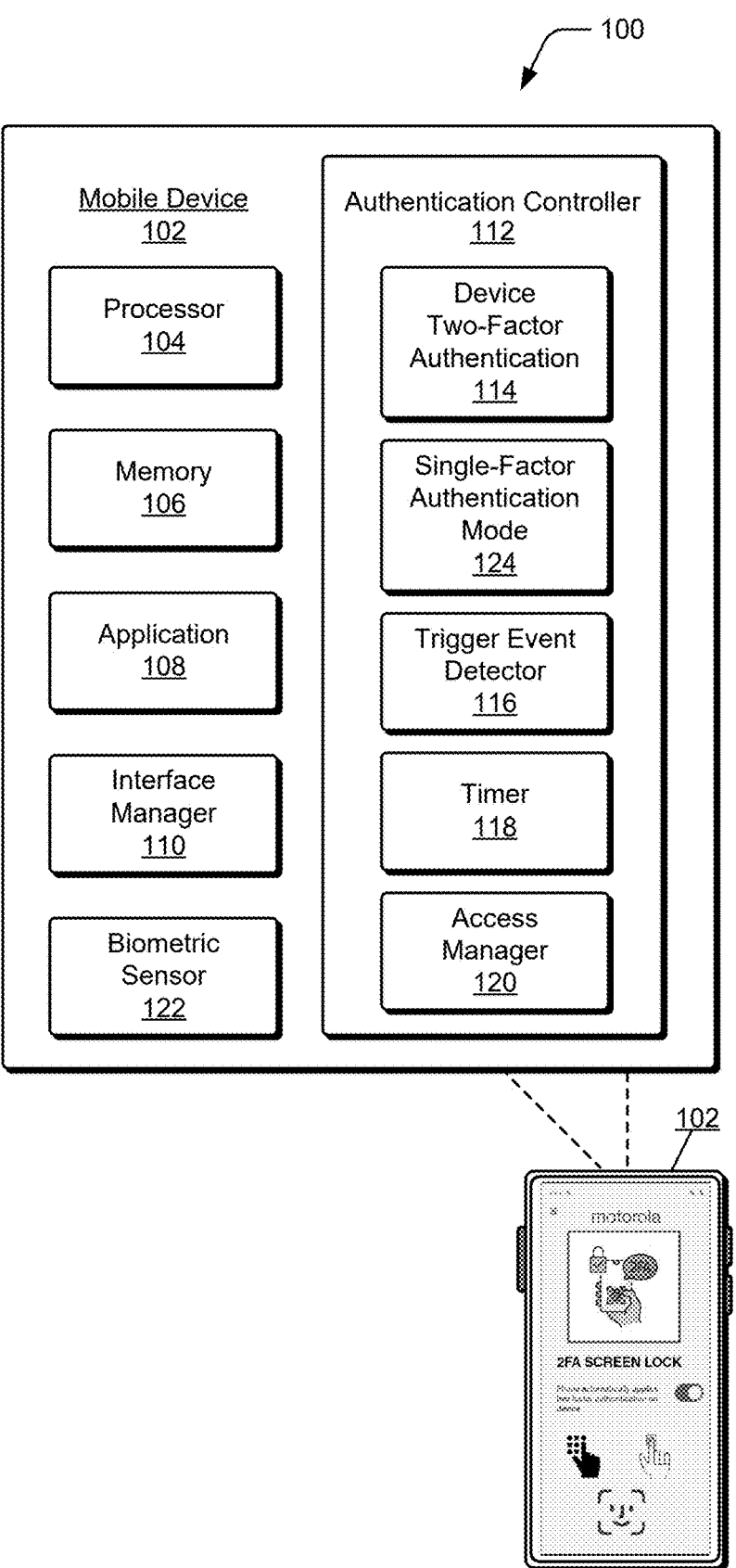
FIG. 1 illustrates an example system for disabling 2FA in response to a trigger event in accordance with one or more implementations as described herein.

Implementations of the techniques for disabling 2FA in response to a trigger event may be implemented as described herein. A mobile device, such as any type of a wireless device, media device, mobile phone, flip phone, client device, tablet, computing, communication, entertainment, gaming, media playback, and/or any other type of computing, consumer, and/or electronic device, or a system of any combination of such devices, may be configured to perform techniques for disabling 2FA in response to a trigger event as described herein. In one or more implementations, a mobile device includes an authentication controller, which can be used to implement aspects of the techniques described herein.

Some systems (e.g., mobile devices, applications, services, etc.) implement security mechanisms to ensure protection of sensitive information and reduce the risk of unauthorized access. One example of a security mechanism is multi-factor authentication (MFA), in which a user must verify their identity through two or more independent factors (e.g., forms of verification) before gaining access to the system. By utilizing the two or more factors, MFA provides multiple layers of protection and thus greater security compared to conventional single-factor authentication methods. As such, even if one factor is compromised, the remaining one or more factors prevent an attacker from gaining access. For instance, a user may reuse a password or select a weak password, and MFA can provide an additional layer of security to compensate for potential vulnerabilities. Many industries and regulatory bodies require MFA to protect confidential information and comply with security standards and regulations.

A mobile device can employ MFA, such as 2FA, to ensure that only authorized users are granted access to the mobile device. For example, to unlock a display of the mobile device using 2FA, a user may need to verify their identify by providing two independent factors. The two independent factors may include, for instance, a password and a successful authentication with a biometric sensor of the mobile device. In some cases, the mobile device may implement MFA only when the mobile device is not in a trusted location or is not connected to a trusted device. MFA can utilize or build on existing independent factors. For instance, 2FA may utilize a primary password and biometric data collected from a biometric sensor of the mobile device. As another example, 2FA can combine a user identifier (ID) and a token generated on a first device to be entered on a second device for access to the second device.

Independent factors can fall into three categories: knowledge factors, possession factors, and inherent factors. A knowledge factor can be a piece of information known only to the user, such as a personal identification number (PIN), a password (e.g., a previously-configured password or a one-time password (OTP)), or an answer to a security question. Possession factors provide user identification through something owned by the user, such as a physical device (e.g., a mobile phone, a security token/key, a hardware fob, an access badge, and so forth), a digital asset (e.g., an email account, an authenticator application, an OTP, a software token/certificate, a hardware token), or the like. An inherent factor is associated with the user's person and can include factors obtained via biometric sensor, such as a fingerprint scan, a retina scan, voice recognition, facial recognition, and so on.

However, MFA may not be appropriate in all scenarios. For example, providing multiple forms of verification can be time-consuming, which may be inconvenient or even unsafe if the user is experiencing an emergency. Moreover, if the user is injured or incapacitated, the user may be unable to provide authorization to access the mobile device to make an emergency call. In another example, the user might wish to share his or her mobile device with another person for purposes such as entertainment, service, repair, or in the above-mentioned emergency scenario. Additionally, or alternatively, issues may arise with authentication factors themselves, such as network problems that prevent the mobile device from receiving a token or OTP, a broken biometric sensor that precludes successful authentication, or a broken touchpad that renders the user unable to enter a password.

To address these and other downsides of MFA, the techniques described herein provide for a mobile device to dynamically and temporarily disable MFA when certain conditions are detected. These conditions can be trigger events, such as an error indication associated with a component of the mobile device, a user input indicating to disable the MFA, an emergency call initiated from the mobile device, and so forth. While the MFA is disabled, the mobile device operates in a single-factor authentication mode and controls access to functionalities of the mobile device. For instance, the mobile device may allow access to one application and block access to all other applications and functionalities. In implementations, the mobile device starts a timer when the MFA is disabled. After expiry of the timer, the mobile device can determine whether to continue operation in the single-factor authentication mode or to re-enable the MFA.

Accordingly, the described techniques enable a mobile device to reduce the risk of security threats and protect against common attacks (e.g., brute force attacks) while adapting to security needs of different scenarios and contexts. By automatically disabling MFA upon detection of a trigger event and temporarily supporting alternative authentication configurations (e.g., single-factor authentication), the user can access the mobile device even if a component of the mobile device associated with an authentication factor is broken. For example, if the touchpad is inoperable, operation in the single-factor authentication mode enables the mobile device to verify the user via facial recognition and prevents the user from being locked out of the mobile device. Additionally, by controlling access to functionalities while operating in the single-factor authentication mode, the mobile device supports increased security that is not provided by the single-factor authentication mode alone. For example, if the one factor associated with the single-factor authentication mode is compromised such that an unauthorized user gains entry to the mobile device, the unauthorized user is still prevented from accessing any functionality other than the allowed application. Accordingly, the techniques described herein ensure continuous protection of sensitive information even when relying on fewer authentication factors.

While features and concepts of the described techniques for disabling 2FA in response to a trigger event is implemented in any number of different devices, systems, environments, and/or configurations, implementations of the techniques for disabling 2FA in response to a trigger event are described in the context of the following example devices, systems, and methods.

FIG. 1 illustrates an example system 100 for disabling 2FA in response to a trigger event, as described herein. The system 100 includes a mobile device 102. Examples of mobile device include at least one of any type of a wireless device, mobile device, mobile phone, flip phone, client device, companion device, tablet, computing device, communication device, entertainment device, gaming device, media playback device, any other type of computing, consumer, and/or electronic device.

The mobile device 102 can be implemented with various components, such as a processor system and memory, and an operating system, as well as any number and combination of different components as further described with reference to the example device shown in FIG. 5. In implementations, the mobile device 102 includes various radios for wireless communication with other devices. For example, the system and devices can include a Bluetooth (BT) and/or Bluetooth Low Energy (BLE) transceiver, as well as a near field communication (NFC) transceiver. In some cases, the system and devices include at least one of a WiFi radio, a cellular radio, a global positioning satellite (GPS) radio, or any available type of device communication interface.

In some implementations, the devices, applications, modules, servers, and/or services described herein communicate via a communication network, such as for data communication with the mobile device 102. The communication network includes a wired and/or a wireless network. The communication network is implemented using any type of network topology and/or communication protocol, and is represented or otherwise implemented as a combination of two or more networks, to include IP-based networks, cellular networks, and/or the Internet. The communication network can include mobile operator networks that are managed by a mobile network operator and/or other network operators, such as a communication service provider, mobile phone provider, and/or Internet service provider.

The mobile device 102 includes various functionality that enables the device to implement different aspects of disabling 2FA in response to a trigger event, as described herein. For example, the mobile device 102 includes a processor 104, a memory 106, an application 108, an interface manager 110, an authentication controller 112 of the device 2FA 114, a trigger event detector 116, a timer 118, an access manager 120, and a biometric sensor 122. In one or more examples, the interface manager 110 represents functionality (e.g., logic and/or hardware) enabling the mobile device 102 to interconnect and interface with other devices and/or networks, such as the communication network. For example, the interface manager 110 enables wireless and/or wired connectivity of the mobile device 102.

The application 108 includes or is an example of any type of device application implemented by the mobile device 102, such as a messaging application, email application, video communication application, cellular communication application, music/audio application, gaming application, media application, social platform applications, and/or any other of the many possible types of various device applications. Many device applications such as the application 108 have an associated application user interface that is generated and displayed for user interaction and viewing, such as on a display screen of the mobile device 102. An application user interface, or any other type of video, image, graphic, and the like, is digital image content that is displayable on the display screen of the mobile device 102. The interface manager 110 may control or otherwise manage content displayed on the display screen of the mobile device 102.

The interface manager 110 controls one or more input/output components of the mobile device 102. In implementations, the mobile device 102 collects user input and provides output to a user using the interface manager 110. For example, the mobile device 102 can receive user input via one or more input components of the interface manager 110 that causes the mobile device 102 to execute instructions, such as disabling the device 2FA 114.

In the example system 100 for disabling 2FA in response to a trigger event, the mobile device 102 implements the authentication controller 112 (e.g., as a device application). As shown in this example, the authentication controller 112 represents functionality (e.g., logic, software, and/or hardware) enabling aspects of the described techniques for disabling 2FA in response to a trigger event. The authentication controller 112 can be implemented as computer instructions stored on computer-readable storage media and can be executed by a processor system of the mobile device 102. Alternatively, or in addition, the authentication controller 112 can be implemented at least partially in hardware of the device.

In one or more implementations, the authentication controller 112 includes independent processing, memory, and/or logic components functioning as a computing and/or electronic device integrated with the mobile device 102. Alternatively, or in addition, the authentication controller 112 can be implemented in software, in hardware, or as a combination of software and hardware components. In this example, the authentication controller 112 is implemented as a software application or module, such as executable software instructions (e.g., computer-executable instructions) that are executable with a processor system of the mobile device 102 to implement the techniques and features described herein. As a software application or module, the authentication controller 112 can be stored on computer-readable storage memory (e.g., memory of a device), or in any other suitable memory device or electronic data storage implemented with the controller. Alternatively or in addition, the authentication controller 112 is implemented in firmware and/or at least partially in computer hardware. For example, at least part of the authentication controller 112 is executable by a computer processor, and/or at least part of the content manager is implemented in logic circuitry.

In this example system 100, the authentication controller 112 controls authentication for the mobile device 102 as described herein. When an MFA mode, such as the device 2FA 114, is enabled for the mobile device 102, the authentication controller 112 receives and verifies each independent factor (e.g., of a set of authentication factors) to authorize a user attempting to gain access to the mobile device 102. For instance, the authentication controller 112 can implement the interface manager 110 to receive user input including a password (e.g., a PIN or other password), such as an audio password received via a microphone of the mobile device 102, a password received via touch input of a display or touchpad of the mobile device 102, or the like. Additionally, or alternatively, the authentication controller 112 can utilize the biometric sensor 122 to collect an inherent factor by performing a retina scan, a fingerprint scan, and/or facial recognition, among other examples. The authentication controller 112 determines whether each factor of the set of authentication factors is successfully authorized. If authentication is successful for all factors, the authentication controller 112 grants access to the mobile device 102, such as by unlocking the display of the mobile device 102.

The authentication controller 112 implements the trigger event detector 116 to monitor for and detect a trigger event while the device 2FA 114 is enabled on the mobile device 102. The trigger event can be, for example, at least one of an error indication associated with a hardware component of the mobile device 102, user input indicating to disable the device 2FA, or an emergency call initiated from the mobile device 102. For instance, the trigger event detector 116 can detect user input received via the interface manager 110 indicating to disable the device 2FA 114. As another example, the trigger event detector 116 can detect one or more error indications associated with a component (e.g., a hardware component) of the mobile device 102, such as the biometric sensor 122. In such examples, to allow the mobile device 102 to be repaired or serviced, the mobile device 102 can receive (e.g., via the communication network) a service token from a verified source, such as a server of a vendor or manufacturer, where the service token is associated with the mobile device 102. The authentication controller 112 authenticates the service token prior to disabling the device 2FA 114.

Upon detecting the trigger event, the authentication controller 112 executes, within a trusted execution environment (TEE) of the mobile device 102, a function to disable the device 2FA 114, thereby restricting operation of the mobile device 102 to a single entry point. That is, the authentication controller 112 is configured to execute the function in response to the trigger event to restrict access to functionality of the mobile device 102. Additionally, by confining the function within the TEE, the function is prevented from being called by any component or application other than the authentication controller 112, thus reducing the likelihood that the function is retrieved by an unauthorized source (e.g., an attacker, a compromised application, etc.). Based on disabling the device 2FA 114, the authentication controller 112 transitions the mobile device 102 to a single-factor authentication mode 124 and starts the timer 118 for operation in the single-factor authentication mode. A duration of the timer 118 can be preconfigured or, in some cases, selected or adjusted by the user. For example, the duration may be preconfigured to a first duration (e.g., two minutes). If the trigger event is user input indicating to disable the device 2FA 114, the authentication controller 112 can control the interface manager 110 to display a prompt allowing the user to modify the first duration to a second duration. The user can, for instance, increase the duration of the timer 118 to enable the mobile device 102 to be shared with another user. That is, by extending the timer 118, the other user can use the mobile device 102 without having to verify with 2FA.

During operation in the single-factor authentication mode 124, the authentication controller 112 may utilize only one factor of the set of authentication factors to verify the user, and may disable or otherwise refrain from using the remaining factors. In implementations, the one factor used in the single-factor authentication mode 124 is selected for use based on the trigger event. As a nonlimiting example, if the trigger event is an error indication for a hardware component of the mobile device 102, the authentication controller 112 selects a factor that is not associated with the hardware component. For instance, if the touchpad or display of the mobile device 102 is broken (e.g., as evidenced by the error indication), the authentication controller 112 can select facial recognition as the factor, thereby enabling the user to avoid having to attempt to enter a password on a broken touchpad. If the biometric sensor 122 is broken, the authentication controller 112 can select password entry as the factor. In any case, while in the single-factor authentication mode 124, the user authenticates with the authentication controller 112 using the one factor to access the mobile device 102. Based on successful authentication, for example, the authentication controller 112 can control the interface manager 110 to unlock the display of the mobile device 102.

Additionally, during operation in the single-factor authentication mode 124, the authentication controller 112 implements the access manager 120 to control (e.g., prevent or allow) access to a functionality of the mobile device 102. In implementations, the access manager 120 allows access to a set (e.g., a preconfigured set) of one or more applications (e.g., the application 108) and prevents access to all other applications. For example, the access manager 120 can allow access to a phone application to enable an emergency call while blocking access to applications that may have sensitive information, such as financial applications, health applications, and the like.

Upon expiry of the timer 118, the authentication controller 112 re-enables the device 2FA 114 and exits the single-factor authentication mode 124. In some implementations, the authentication controller 112 performs periodic checks while operating in the single-factor authentication mode and/or after expiry of the timer 118. In some cases, such checks include the authentication controller 112 determining whether the mobile device 102 is locked or unlocked, and re-enabling the device 2FA if the mobile device 102 is locked while in the single-factor authentication mode. Additionally, or alternatively, the periodic checks can include authorization attempts. If the mobile device 102 is unlocked, the authentication controller 112 can perform another check to determine whether the user is an authorized user. For example, if the mobile device 102 is unlocked, the authentication controller 112 utilizes the biometric sensor 122 to perform facial recognition. If the facial recognition is successful (e.g., if the user verifies as an authorized user), the authentication controller 112 restarts the timer 118 to extend the duration of operation in the single-factor authentication mode 124. If the facial recognition fails, the authentication controller 112 can lock the mobile device 102 and/or re-enable the device 2FA 114.

Example methods 200, 300, and 400 are described with reference to respective FIGS. 2, 3, and 4 in accordance with one or more implementations of disabling 2FA in response to a trigger event, as described herein. Generally, any services, components, modules, managers, controllers, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FP-GAs), Application-specific Integrated Circuits (ASICs), Application-specific Standard Products (ASSPs), System-on-a-chip systems (SoCs), Complex Programmable Logic Devices (CPLDs), and the like.

Figure 2:
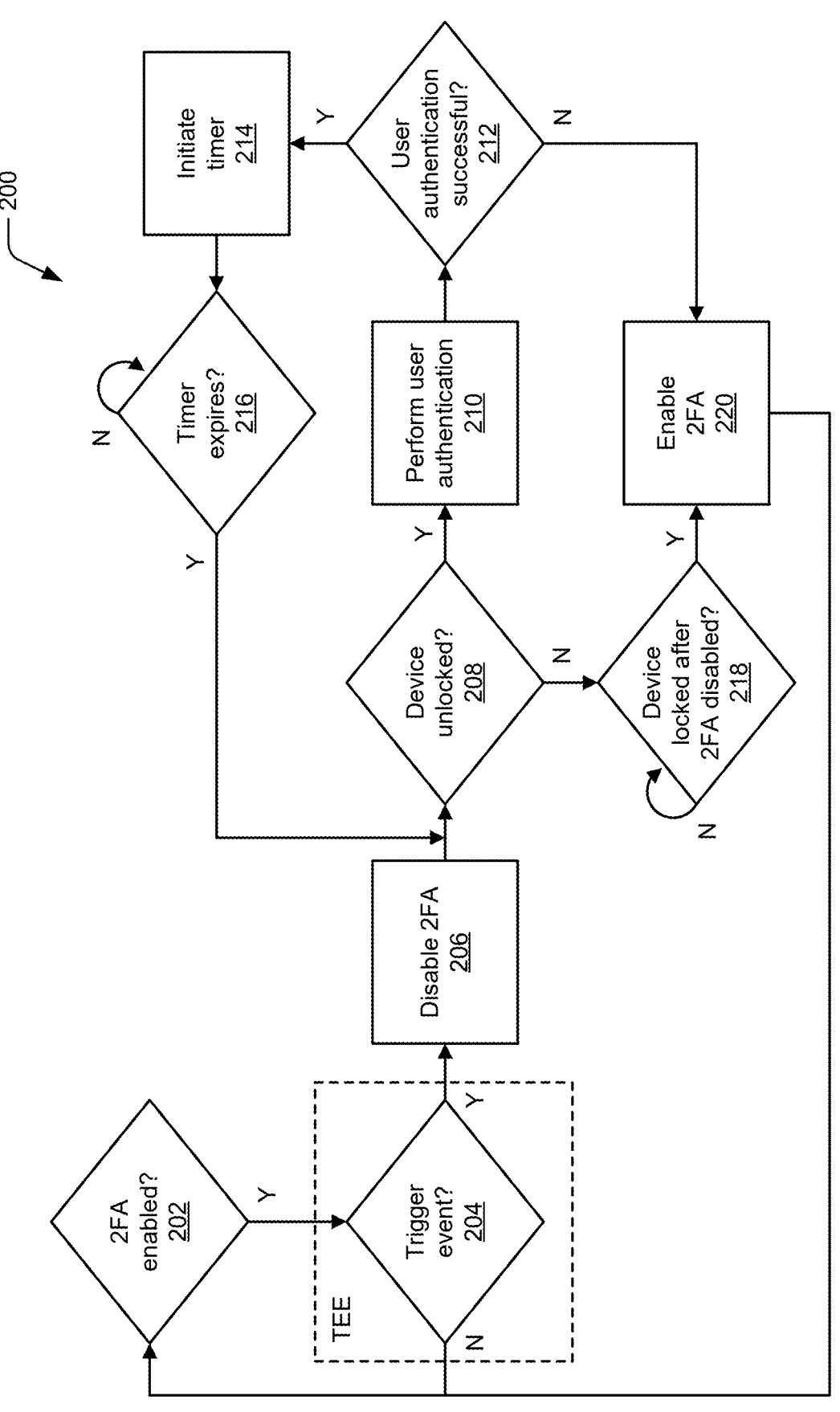

FIG. 2 illustrates an example method 200 of disabling 2FA in response to a trigger event, as described herein. The order in which the method is described is not intended to be construed as a limitation, and any number or combination of the described method operations may be performed in any order to perform a method, or an alternate method. The method 200 may implement or be implemented by the mobile device 102 as described with reference to FIG. 1. For example, the method 200 may be implemented by the mobile device 102 when the mobile device 102 supports 2FA.

At 202, it is determined whether 2FA is enabled on a device. For example, the authentication controller 112 of the mobile device 102 determines whether the device 2FA 114 is enabled on the mobile device 102.

If the device 2FA is enabled, then at 204, a determination is made as to whether a trigger event has occurred. For example, the trigger event detector 116 monitors for a trigger event, such as an error indication associated with a hardware component of the mobile device 102, user input indicating to disable the device 2FA 114, an emergency call initiated from the mobile device 102, and/or a combination thereof. When the trigger event is user input indicating to disable the device 2FA, the interface manager 110 can receive additional user input indicating a change (e.g., an increase or a decrease) in a duration of the timer 118 associated with operation in the single-factor authentication mode 124, and the authentication controller 112 can modify the timer 118 according to the additional user input. In some examples, when the trigger event is the error indication, the authentication controller 112 receives a service token (e.g., a service center token) associated with the mobile device 102. For instance, the authentication controller 112 can receive the service token from a trusted source, such as a server, and the service token may include an indication of an identifier unique to the mobile device 102. The identifier may include or be an example of a device-specific identifier (e.g., a serial number), a network-specific identifier (e.g., a subscriber identity), a subscription or service identifier, or the like, among other examples. The authentication controller 112 verifies the service token by comparing the indication to the identifier of the mobile device 102. If the indication matches the identifier, the authentication controller 112 determines that authentication of the service token is successful.

If a trigger event occurs (i.e., "Yes" (Y) at 204), then at 206, the 2FA is disabled. For example, when the trigger event detector 116 detects a trigger event, the authentication controller 112 disables the device 2FA 114 in response, and transitions to operation in the single-factor authentication mode 124. During operation in the single-factor authentication mode 124, the access manager 120 controls access to functionality of the mobile device 102. As an example, the access manager 120 can allow access to one or more applications of the mobile device 102 and/or prevent access to one or more other applications of the mobile device 102. In implementations, the authentication controller 112 executes, within a TEE of the mobile device 102, a function to disable the device 2FA 114. Additionally, or alternatively, if the authentication controller 112 receives a service token (e.g., as an event at 204), the authentication controller 112 may perform authentication of the service token prior to disabling the device 2FA. For instance, the authentication controller 112 may disable the device 2FA 114 based on successful authentication of the service token and/or may refrain from disabling the device 2FA if authentication of the service token fails.

At 208, a determination is made as to whether the device is unlocked. For example, subsequent to disabling the device 2FA 114, the authentication controller 112 implements the interface manager 110 to determine whether a display of the mobile device 102 is locked or unlocked. If the device is unlocked (i.e., "Y" from 208), then at 210, user authentication is performed in accordance with the single-factor authentication mode. For example, the authentication controller 112 can perform single-factor authentication by verifying a password received via user input, performing facial recognition using the biometric sensor 122, or the like.

At 212, a determination is made as to whether the user authentication is successful. For instance, the authentication controller 112 determines whether the password received at 210 is correct, if the facial recognition performed at 210 is successful, etc. for user authentication. If the user authentication is successful (i.e., "Y" from 212), then at 214, a timer is started (or initiated). For example, the authentication controller 112 starts the timer 118 based on disabling the device 2FA 114 and the successful user authorization. In implementations, the duration of the timer 118 is preconfigured. Additionally, or alternatively, the duration of the timer 118 is set or modified by the user (e.g., in response to user input).

At 216, a determination is made as to whether the timer is expired. For example, the authentication controller 112 determines whether the timer 118 is expired. If the timer 118 has not yet expired (i.e., "No" (N) from 216), then the authentication controller 112 may re-check the timer 118 periodically until the authentication controller 112 detects expiry of the timer 118. If the timer has expired (i.e., "Y" from 216), then the process continues to determine whether the device is unlocked at 208. For instance, based on a determination that the timer 118 has expired, the authentication controller 112 determines whether the mobile device 102 is unlocked.

If it is determined that the mobile device 102 is not unlocked (or still locked) (i.e., "N" from 208), then at 218, a determination is made as to whether the device was locked after the 2FA was disabled (e.g., at 206). For example, subsequent to disabling the device 2FA 114, the interface manager 110 of the authentication controller 112 determines whether the display of the mobile device 102 is locked. If the display is not locked, the authentication controller 112 may periodically re-check the display until the authentication controller 112 detects that the display is locked.

If the mobile device is locked after the 2FA was disabled (i.e., "Y" from 218), or if the user authentication was not successful (i.e., "N" from 212), then at 220, the 2FA is enabled (e.g., re-enabled). For example, based on determining that the display of the mobile device 102 is locked, or based on successful user authentication, the authentication controller 112 re-enables the device 2FA 114. For example, the authentication controller 112 may re-enable the device 2FA 114 in response to a failed authentication.

FIG. 3 illustrates example method(s) 300 for disabling 2FA in response to a trigger event. The order in which the method is described is not intended to be construed as a limitation, and any number or combination of the described method operations may be performed in any order to perform a method, or an alternate method. The method 300 may implement or be implemented by the mobile device 102 as described with reference to FIG. 1.

At 302, a trigger event is detected while 2FA is enabled on a mobile device 102. For example, the authentication controller 112 implements the trigger event detector 116 to detect a trigger event, such as an error indication associated with a hardware component of the mobile device 102, user input indicating to disable the device 2FA 114, or an emergency call initiated from the mobile device. At 304, the 2FA is disabled in response to the trigger event. For example, the authentication controller 112 disables the device 2FA 114 based on detection of the trigger event by the trigger event detector 116, thereby restricting operation of the mobile device 102 and restricting or limiting access to functionality of the mobile device. At 306, a timer for operation in a single-factor authentication mode is initiated based on the 2FA being disabled. For example, the authentication controller 112 starts the timer 118 based on disabling the device 2FA 114.

FIG. 4 illustrates example method(s) 400 for disabling 2FA in response to a trigger event. The order in which the method is described is not intended to be construed as a limitation, and any number or combination of the described method operations may be performed in any order to perform a method, or an alternate method. The method 400 may implement or be implemented by the mobile device 102 as described with reference to FIG. 1.

At 402, 2FA on a mobile device is disabled in response to an error indication associated with a hardware component of the mobile device, user input indicating to disable the two-factor authentication, and/or an emergency call initiated from the mobile device. For example, the trigger event detector 116 detects the error indication, the user input, and/or the emergency call, and in response, the authentication controller 112 disables the device 2FA 114.

At 404, a timer for operation in a single-factor authentication mode is initiated based on the 2FA being disabled. For example, subsequent to disabling the device 2FA 114, the authentication controller 112 starts the timer 118 for operation in the single-factor authentication mode 124 of the device.

At 406, access to a functionality of the mobile device is controlled during operation in the single-factor authentication mode. For example, the authentication controller 112 utilizes the access manager 120 to control access to functionality of the mobile device 102 while operating in the single-factor authentication mode 124 of the device.

Figure 5:
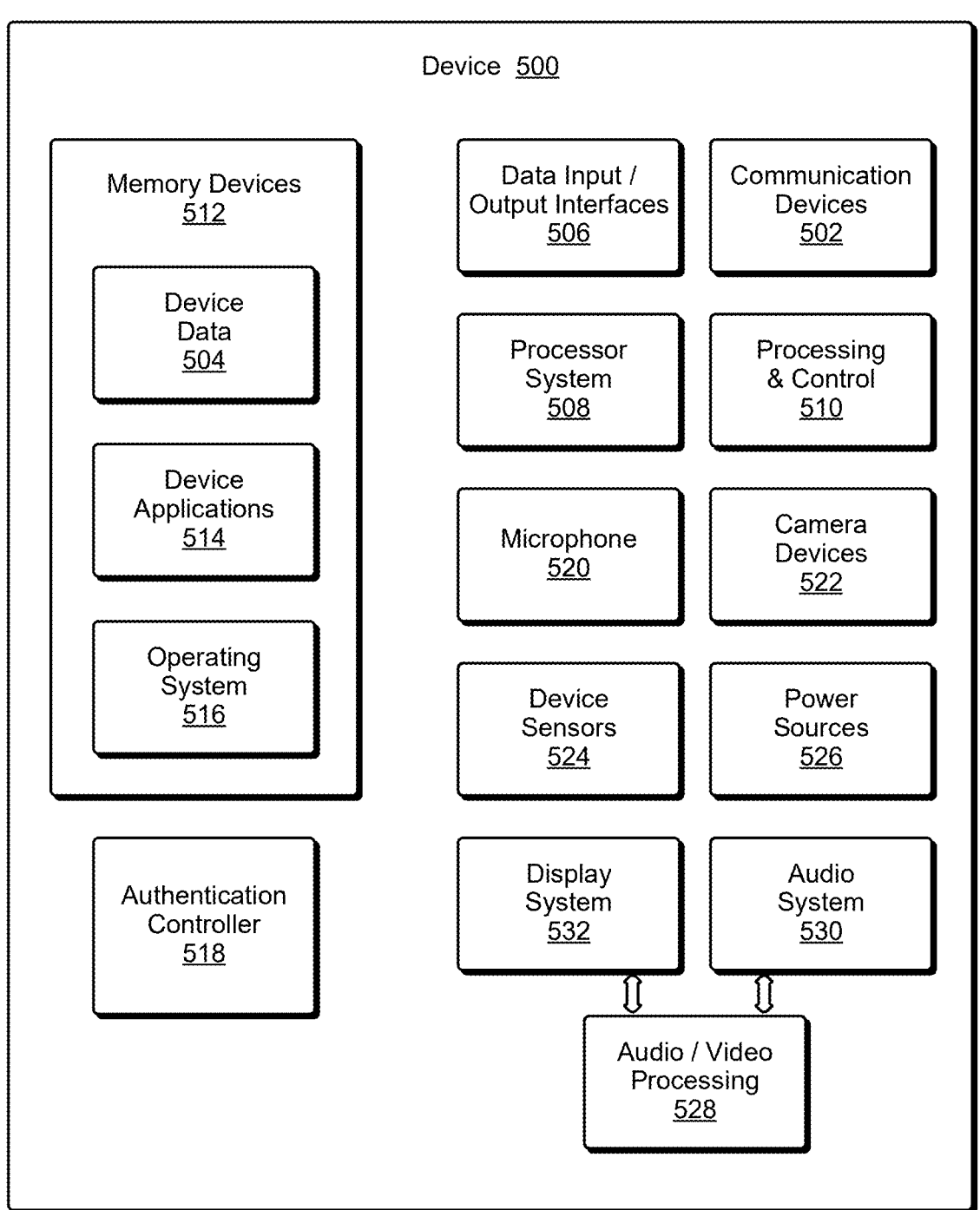
FIG. 5 illustrates various components of an example device that may be used to implement the techniques for disabling 2FA in response to a trigger event as described herein.

FIG. 5 illustrates various components of an example device 500, which can implement aspects of the techniques and features for disabling 2FA in response to a trigger event, as described herein. The example device 500 may be implemented as any of the devices described with reference to the previous FIGS. 1-4, such as any type of a wireless device, mobile device, mobile phone, flip phone, client device, companion device, display device, tablet, computing, communication, entertainment, gaming, media playback, and/or any other type of computing, consumer, and/or electronic device. For example, the mobile device 102 described with reference to FIGS. 1-4 may be implemented as the example device 500.

The example device 500 can include various, different communication devices 502 that enable wired and/or wireless communication of device data 504 with other devices. The device data 504 can include any of the various devices, data and content that is generated, processed, determined, received, stored, and/or communicated from one computing device to another. Generally, the device data 504 can include any form of audio, video, image, graphics, and/or electronic data that is generated by applications executing on a device. The communication devices 502 can also include transceivers for cellular phone communication and/or for any type of network data communication.

The example device 500 can also include various, different types of data input/output (I/O) interfaces 506, such as data network interfaces that provide connection and/or communication links between the devices, data networks, and other devices. The data I/O interfaces 506 may be used to couple the device to any type of components, peripherals, and/or accessory devices, such as a computer input device that may be integrated with the example device 500. The I/O interfaces 506 may also include data input ports via which any type of data, information, media content, communications, messages, and/or inputs may be received, such as user inputs to the device, as well as any type of audio, video, image, graphics, and/or electronic data received from any content and/or data source.

The example device 500 includes a processor system 508 of one or more processors (e.g., any of microprocessors, controllers, and the like) and/or a processor and memory system implemented as a system-on-chip (SoC) that processes computer-executable instructions. The processor system 508 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively, or in addition, the device may be implemented with any one or combination of software, hardware, firmware, or fixed logic circuitry that may be implemented in connection with processing and control circuits, which are generally identified at 510. The example device 500 may also include any type of a system bus or other data and command transfer system that couples the various components within the device. A system bus can include any one or combination of different bus structures and architectures, as well as control and data lines.

The example device 500 also includes memory and/or memory devices 512 (e.g., computer-readable storage memory) that enable data storage, such as data storage devices implemented in hardware which may be accessed by a computing device, and that provide persistent storage of data and executable instructions (e.g., software applications, programs, functions, and the like). Examples of the memory devices 512 include volatile memory and non-volatile memory, fixed and removable media devices, and any suitable memory device or electronic data storage that maintains data for computing device access. The memory devices 512 can include various implementations of random-access memory (RAM), read-only memory (ROM), flash memory, and other types of storage media in various memory device configurations. The example device 500 may also include a mass storage media device.

The memory devices 512 (e.g., as computer-readable storage memory) provide data storage mechanisms, such as to store the device data 504, other types of information and/or electronic data, and various device applications 514 (e.g., software applications and/or modules). For example, an operating system 516 may be maintained as software instructions with a memory device 512 and executed by the processor system 508 as a software application. The device applications 514 may also include a device manager, such as any form of a control application, software application, signal-processing and control module, code that is specific to a particular device, a hardware abstraction layer for a particular device, and so on.

In this example, the device 500 includes an authentication controller 518 that implements various aspects of the described features and techniques described herein. The authentication controller 518 may be implemented with hardware components and/or in software as one of the device applications 514, such as when the example device 500 is implemented as the mobile device 102 described with reference to FIGS. 1-4. An example of the authentication controller 518 is the authentication controller 112 implemented by the mobile device 102, such as a software application and/or as hardware components in the mobile device. In implementations, the authentication controller 518 may include independent processing, memory, and logic components as a computing and/or electronic device integrated with the example device 500.

The example device 500 can also include a microphone 520 (e.g., to capture an audio recording) and/or camera devices 522 (e.g., to capture video images), as well as device sensors 524, such as may be implemented as components of an inertial measurement unit (IMU). The device sensors 524 may be implemented with various sensors, such as a gyroscope, an accelerometer, and/or other types of motion sensors to sense motion of the device. The device sensors 524 can generate sensor data vectors having three-dimensional parameters (e.g., rotational vectors in x, y, and z-axis coordinates) indicating location, position, acceleration, rotational speed, and/or orientation of the device. The example device 500 can also include one or more power sources 526, such as when the device is implemented as a wireless device and/or a mobile device. The power sources may include a charging and/or power system, and may be implemented as a flexible strip battery, a rechargeable battery, a charged super-capacitor, and/or any other type of active or passive power source.

The example device 500 can also include an audio and/or video processing system 528 that generates audio data for an audio system 530 and/or generates display data for a display system 532. The audio system and/or the display system may include any types of devices or modules that generate, process, display, and/or otherwise render audio, video, display, and/or image data. Display data and audio signals may be communicated to an audio component and/or to a display component via any type of audio and/or video connection or data link. In implementations, the audio system and/or the display system are integrated components of the example device 500. Alternatively, the audio system and/or the display system are external, peripheral components to the example device.

Although implementations for disabling 2FA in response to a trigger event have been described in language specific to features and/or methods, the appended claims are not necessarily limited to the specific features or methods described. Rather, the specific features and methods are disclosed as example implementations for disabling 2FA in response to a trigger event, and other equivalent features and methods are intended to be within the scope of the appended claims. Further, various different examples are described, and it is to be appreciated that each described example may be implemented independently or in connection with one or more other described examples. Additional aspects of the techniques, features, and/or methods discussed herein relate to one or more of the following:

A mobile device, comprising: at least one memory; and at least one processor coupled with the at least one memory and configured to cause the mobile device to: detect a trigger event while 2FA is enabled on the mobile device; disable the 2FA in response to the trigger event; and initiate a timer for operation in a single-factor authentication mode based at least in part on the 2FA being disabled.

Alternatively, or in addition to the above-described mobile device, any one or combination of: to operate in the single-factor authentication mode, the at least one processor is configured to cause the mobile device to control access to a functionality of the mobile device. Access to the functionality of the mobile device includes access to at least one application of the mobile device. The at least one processor is configured to cause the mobile device to enable the 2FA after expiry of the timer. The at least one processor is configured to cause the mobile device to: determine that the mobile device is unlocked after expiry of the timer; and perform authorization using a biometric sensor. The at least one processor is configured to cause the mobile device to restart the timer based on successful authorization. The at least one processor is configured to cause the mobile device to enable the 2FA based on failed authorization. The at least one processor is configured to cause the mobile device to: determine that the mobile device is locked subsequent to the 2FA being disabled; and enable the 2FA based on the mobile device being locked. To disable the 2FA, the at least one processor is configured to cause the mobile device to execute a function in a trusted execution environment of the mobile device. The at least one processor is configured to cause the mobile device to: receive, from a server, a service token associated with the mobile device based at least in part on the trigger event is an error indication associated with a hardware component of the mobile device; and authenticate the service token prior to the 2FA being disabled. The at least one processor is configured to cause the mobile device to modify a time duration of the timer based at least in part on the trigger event is a user input indicating to disable the 2FA. The trigger event comprises an emergency phone call initiated from the mobile device.

A method, comprising: detecting a trigger event while 2FA is enabled on the mobile device; disabling the 2FA in response to the trigger event; and initiating a timer for operation in a single-factor authentication mode based at least in part on the 2FA being disabled.

Alternatively, or in addition to the above-described method, any one or combination of: operation in the single-factor authentication mode comprises controlling access to a functionality of the mobile device. Access to the functionality of the mobile device includes access to at least one application of the mobile device. Enabling the 2FA after expiry of the timer. Determining that the mobile device is unlocked after expiry of the timer; and performing authorization using a biometric sensor. Restarting the timer based on successful authorization. Enabling the 2FA based on failed authorization.

A mobile device, comprising: at least one memory; and at least one processor coupled with the at least one memory and configured to cause the mobile device to: disable 2FA on the mobile device in response to at least one of an error indication associated with a hardware component of the mobile device, user input indicating to disable the 2FA, or an emergency call initiated from the mobile device; initiate a timer for operation in a single-factor authentication mode based at least in part on the 2FA being disabled; and control access to a functionality of the mobile device during operation in the single-factor authentication mode.

The invention claimed is:

1. A mobile device comprising:
at least one memory; and
at least one processor coupled with the at least one memory and configured to cause the mobile device to:
    detect a trigger event while two-factor authentication is enabled on the mobile device;
    disable the two-factor authentication in response to the trigger event; and
    initiate a timer for operation in a single-factor authentication mode based at least in part on the two-factor authentication being disabled.

2. The mobile device of claim 1, wherein, to operate in the single-factor authentication mode, the at least one processor is configured to cause the mobile device to control access to a functionality of the mobile device.

3. The mobile device of claim 2, wherein access to the functionality of the mobile device includes access to at least one application of the mobile device.

4. The mobile device of claim 1, wherein the at least one processor is configured to cause the mobile device to enable the two-factor authentication after expiry of the timer.

5. The mobile device of claim 1, wherein the at least one processor is configured to cause the mobile device to:
    determine that the mobile device is unlocked after expiry of the timer; and
    perform authorization using a biometric sensor.

6. The mobile device of claim 5, wherein the at least one processor is configured to cause the mobile device to restart the timer based on successful authorization.

7. The mobile device of claim 5, wherein the at least one processor is configured to cause the mobile device to enable the two-factor authentication based on failed authorization.

8. The mobile device of claim 1, wherein the at least one processor is configured to cause the mobile device to:
    determine that the mobile device is locked subsequent to the two-factor authentication being disabled; and
    enable the two-factor authentication based on the mobile device being locked.

9. The mobile device of claim 1, wherein, to disable the two-factor authentication, the at least one processor is configured to cause the mobile device to execute a function in a trusted execution environment of the mobile device.

10. The mobile device of claim 1, wherein the at least one processor is configured to cause the mobile device to:
    receive, from a server, a service token associated with the mobile device based at least in part on the trigger event is an error indication associated with a hardware component of the mobile device; and
    authenticate the service token prior to the two-factor authentication being disabled.

11. The mobile device of claim 10, wherein the at least one processor is configured to cause the mobile device to modify a time duration of the timer based at least in part on the trigger event is a user input indicating to disable the two-factor authentication.

12. The mobile device of claim 1, wherein the trigger event comprises an emergency phone call initiated from the mobile device.

13. A method performed by a mobile device, the method comprising:
    detecting a trigger event while two-factor authentication is enabled on the mobile device;
    disabling the two-factor authentication in response to the trigger event; and
    initiating a timer for operation in a single-factor authentication mode based at least in part on the two-factor authentication being disabled.

14. The method of claim 13, wherein operation in the single-factor authentication mode comprises controlling access to a functionality of the mobile device.

15. The method of claim 14, wherein access to the functionality of the mobile device includes access to at least one application of the mobile device.

16. The method of claim 13, further comprising enabling the two-factor authentication after expiry of the timer.

17. The method of claim 13, further comprising:
    determining that the mobile device is unlocked after expiry of the timer; and
    performing authorization using a biometric sensor.

18. The method of claim 17, further comprising restarting the timer based on successful authorization.

19. The method of claim 17, further comprising enabling the two-factor authentication based on failed authorization.

20. A mobile device, comprising:
at least one memory; and
at least one processor coupled with the at least one memory and configured to cause the mobile device to:
    disable two-factor authentication on the mobile device in response to at least one of an error indication associated with a hardware component of the mobile device, user input indicating to disable the two-factor authentication, or an emergency call initiated from the mobile device;
    initiate a timer for operation in a single-factor authentication mode based at least in part on the two-factor authentication being disabled; and
    control access to a functionality of the mobile device during operation in the single-factor authentication mode.

*    *    *    *    *